US008135504B2

(12) United States Patent
Summers

(10) Patent No.: US 8,135,504 B2
(45) Date of Patent: Mar. 13, 2012

(54) NAVIGATIONAL PLANNING AND DISPLAY METHOD FOR THE SAILOR'S DILEMMA WHEN HEADING UPWIND

(76) Inventor: Craig Summers, Glen Haven (CA)

( * ) Notice: Subject to any disclaimer, the term of this patent is extended or adjusted under 35 U.S.C. 154(b) by 820 days.

(21) Appl. No.: 12/295,957

(22) PCT Filed: Apr. 12, 2007

(86) PCT No.: PCT/CA2007/000600
§ 371 (c)(1), (2), (4) Date: Oct. 3, 2008

(87) PCT Pub. No.: WO2007/115411
PCT Pub. Date: Oct. 18, 2007

(65) Prior Publication Data

US 2009/0287409 A1 Nov. 19, 2009

(51) Int. Cl.
*B60L 3/00* (2006.01)
*B60L 15/00* (2006.01)

(52) U.S. Cl. ................ 701/21; 701/23; 701/25; 701/26; 701/201; 701/202; 701/204; 701/207; 701/210; 701/213; 114/39.11; 114/291

(58) Field of Classification Search .................... 701/21, 701/201, 202, 204, 23, 25, 26, 207, 210, 701/213; 114/39.11, 291
See application file for complete search history.

(56) References Cited

U.S. PATENT DOCUMENTS 4,150,491 A * 4/1979 Ansar ............................ 33/349
4,283,943 A * 8/1981 Schoneberger, Jr. ....... 73/170.03
4,689,476 A * 8/1987 Katz .......................... 235/88 N
4,809,986 A * 3/1989 Pearce, Sr. .................... 273/246
4,855,577 A * 8/1989 McLain ...................... 235/78 N
5,167,072 A * 12/1992 Richardson .................. 33/1 SD
5,264,682 A * 11/1993 Copland ..................... 235/78 N
5,559,707 A * 9/1996 DeLorme et al. ............. 701/467
6,308,649 B1 * 10/2001 Gedeon ...................... 114/39.11
6,666,160 B1 * 12/2003 Orneblad ...................... 114/291
7,136,744 B2 * 11/2006 Maeda .......................... 701/411
7,768,443 B2 * 8/2010 Imazu et al. ................... 342/41
2007/0062428 A1 * 3/2007 Eveleth ...................... 114/39.31

FOREIGN PATENT DOCUMENTS

CA 1 112 954 8/1979

* cited by examiner

*Primary Examiner* — Khoi Tran
*Assistant Examiner* — Jorge Peche
(74) *Attorney, Agent, or Firm* — Roberts & Roberts, LLP

(57) ABSTRACT

A method is disclosed that resolves a long-standing seafaring problem of how close to the wind to sail. Sailboats need a convenient way to determine the optimal heading to minimize the Tacking Time to Destination (TTD). Unlike Velocity Made Good (VMG), the method disclosed here allows route planning before the trip, predicts travel time on different points of sail, allows comparison of the optimal tacking routes, and also plots the different routes so that it is inherently obvious that a particular tacking angle is longer and more off-course but will arrive sooner because of the speed on that heading. These principles can be implemented with manual dials that define the distance and speed, to calculate the relative or actual travel time on a leg without using electronics. Software is also described that visually illustrates the current and optimal headings by calculating Tacking Time to Destination before departure.

19 Claims, 6 Drawing Sheets

| Angle to Wind (degrees) | % of Maximum (Hull) Speed |
|---|---|
| 0 (straight into the wind) | 0 |
| 10 | 10 |
| 20 | 20 |
| 30 | 30 |
| 40 | 80 |
| 45 | 100 |
| 50 | 90 |
| 60 | 80 |
| 70 | 80 |
| 80 | 80 |
| 90 | 80 |
| 100 | 80 |
| 110 | 80 |
| 120 | 80 |
| 130 | 80 |
| 140 | 70 |
| 150 | 70 |
| 160 | 70 |
| 170 | 70 |
| 180 (straight downwind) | 70 |

Figure 4

NAVIGATIONAL PLANNING AND DISPLAY METHOD FOR THE SAILOR'S DILEMMA WHEN HEADING UPWIND

FIELD OF INVENTION

This invention provides a method to solve the long-standing sailor's dilemma of defining a navigational route with the best tradeoff between speed and distance when sailing upwind, in order to obtain the shortest Tacking Time to Destination (TTD). Unlike assessments of Velocity Made Good (VMG), the methods disclosed here predict travel time, allow the current and optimal routes to be plotted and understood visually, and can be conveniently calculated without boat movement and trial and error route testing. The methods disclosed make the current generation of GPS chartplotters more useful for sailors, and can also be implemented in a manual device with moving dials to determine headings.

BACKGROUND OF INVENTION

In sailing, whether for long passages, short day-sails or for racing, it is important to be able to determine the best heading upwind. There do not appear to be any electronic devices, mechanical mapping tools or even standardized calculations available to plot the best route in advance. So whether in a large yacht or a small sailing dinghy, the skipper is left to their own judgment or trial and error about the heading. However, even experienced sailors have a difficult time picking the optimal sailing angle. Because the problem relies on trigonometry and speed calculations, there is nothing intuitive to help in determining the correct tradeoff. Smaller sailboats often do not even have a speedometer on board. Yet variations in the heading from the optimal course can add substantially to the arrival time, if the boat speed is halved to head closer to the target or if the distance is multiplied to get more speed off the wind.

What sail boats need is a convenient method of predicting Tacking Time to Destination ("TTD") that takes into account the tradeoff between the boat's increasing speed as it heads off the wind and the increased distance. As we know, heading too far upwind shortens your route but slows down the boat. So the sailor needs to know the optimum route, both for racing and for long cruising passages, in order to get the best tradeoff between distance and speed.

Sailboat manufacturers sometimes create velocity prediction plots showing boat speed on different points of sail relative to the wind. However, this is only part of the information needed to determine the optimal Tacking Time to Destination. There are also tactical compasses that help to maintain the same angle to the wind when tacking. However, these units are expensive and require several boat tacks to calibrate with the wind, every time they are used. They also assume that the fastest way to get to a destination is simply to go as fast as possible, which is not always true. They are also limited to showing the sailing angle for maximal boat speed, rather than any distance information, travel time, or logic regarding minimizing the travel time to the destination.

Trigonometric tables may not have been widely available in the golden age of sail up to the 19th Century. With motorized shipping the issue of minimizing Tacking Time to Destination had less practical importance. Within the last decade, satellite phones have become widely accessible for web, email and telephone access at sea. Similarly the Global Positioning System (GPS) has become widely available beyond military applications and has displaced the sextant and celestial navigation for offshore cruising. Although trigonometric calculations can be made from GPS positions, current standards for navigation software and GPS chartplotters still seem to be designed for motorized naval vessels. GPS chartplotters assume that parameters like distance to destination and estimated time of arrival should be calculated as the crow (or seagull) flies, based on the shortest straight line to the destination.

GPS receivers and chartplotters offer a range of information and calculations for: location, elevation, estimated time of arrival (ETA), boat speed, distance to destination. These types of parameters can be displayed in a variety of interfaces showing steering down a road, a series of gauges, an aerial view of a chart, or a 3D scene model, for example. Unfortunately, for the sailor there is no way to get the best sailing angle from the current generation of GPS systems, and the straight-line Estimated Time of Arrival (ETA) has little value. One lesser-known parameter that is often available in GPS units is Velocity Made good (VMG). VMG assesses the component of speed towards the destination when tacking. However, VMG requires that the boat be driven in different directions to determine the best speed by trial and error. This is not practical and requires purposely heading in wrong directions. VMG also does not predict tacking time to destination or indicate the distances required. It is only a speed measure, not a heading that can be displayed and evaluated on an overview or chartplotter before a trip. A convenient system is needed to calculate and display the optimal route ahead of time, showing the angles, distances and travel time involved in different tacking routes. It should also be possible to define the optimal route, particularly where there is a counter-intuitive tradeoff such as a need to travel farther to arrive sooner (because of greater speed off the wind). Finally, it should be possible to determine and display the travel time, distance and heading angles for the current route in comparison to the optimal route.

For sailboats on passages, defining the optimal course and knowing how long it will take can have important consequences; for making landfall during daylight, for example. GPS chartplotters assume that the sailboat travels like a motorboat, straight along the rhumb line (i.e., the direct route to the target destination). However, sailboats have to tack back and forth when heading upwind (and sometimes when the wind is directly astern, as well). A method is needed by which sailors can address the long-standing navigational dilemma of how far off-course to head, to maximize speed off the wind. For sailboats heading upwind, there is no way of knowing how long different zig-zagging tacks will take or predicting this in advance.

In the long history of seafaring there has never been an easy method for determining which heading will lead to the fastest arrival time. What sailboats need is a "Tacking Time to Destination" (TTD) that takes into account the tradeoff between the boat's speed as it heads off the wind in relation to the increased distance. Then, a method of evaluating all of the possible routes is needed, to arrive at a decision of which is the optimal route to get to the destination with the shortest travel time. As we know, heading too far upwind shortens your route but slows down the boat. Conversely, heading off the wind will allow more speed, but at the cost of a much further distance to travel. So the sailor needs to know the optimum route, both for racing and for long cruising passages, in order to get the best tradeoff of a short route at a good speed. Ideally, a system is needed that can be taken on board that would quickly indicate the best heading to get to the destination fastest. This is the central navigating dilemma in sailboats of all sizes.

SUMMARY OF THE INVENTION

Part of the spirit of sailing is the freedom to go where the wind takes you, with no rushing and no schedules. But even without the constraints of racing or passagemaking, at the end of the day even a daysailor out for an afternoon's fun needs to get home as efficiently as possible—across an ocean, a lake or even just across a pond.

When your destination is upwind, there is a choice between pinching as close to the wind as possible (which reduces the speed), or sailing farther off the wind, which takes you in the wrong direction but at a much greater speed. A system is described here to conveniently determine and display the optimal heading before leaving with no trial and error. The method disclosed evaluates tradeoffs between tacking distance and speed on different points of sail, to minimize the Tacking Time to Destination (TTD). An experienced sailor may be able to judge the wind direction and may know the speed of the vessel and the distance to the destination. But even with all of this information, there are few if any clues that make the judgment of the optimal heading intuitive. And heading either slightly upwind or downwind of the optimal heading could add substantially to the arrival time.

Unlike Velocity Made Good (VMG), the method disclosed here uses information on wind direction and polar plots for speed on different points of sail to define and compare different routes ahead of time. A further innovation is the ability to plot the different routes on an aerial photo, a chartplotter or a schematic diagram. This makes it clear that although a particular route may be a farther distance, the arrival time is faster because of the larger boat speed. The method disclosed here can define the distance, speed and tacking time to destination for the current route, and compare this to the optimal route with a display of the routes and numerical data on distance, speed and travel time. This method is designed to be convenient and quick as well, and does not require actually sailing a variety of courses to determine the best route by trial and error.

A schematic diagram of a typical route is shown in FIG. 1. The boat starts at the Current Position and wants to go upwind to the Target. However, a sailboat cannot head straight into the wind. If it went straight along the black line (called the Rhumb Line), it would have little wind power and substantial wind resistance, perhaps reducing the boat speed to 2 knots. If is 10 nautical miles to the Target going the most direct route would take 5 hours.

Alternatively, the sailboat could take the dotted line heading off the wind. This produces lift in the sails and good boat speed (e.g., 8 knots). But now the boat has to go a longer distance (although the distance is difficult to define mentally because it requires trigonometric calculations). Perhaps the distance is now 20 nautical miles. If the boat needs to go 20 nautical miles at 8 knots, it will now take 2.5 hours to finish—half the time required along the more direct rhumb line.

Note that the tacking distance is the same if the same angles are maintained, regardless of the length of each leg. There can be many short legs or just two long legs on the same headings, and the distances will remain constant. In FIG. 1, the lines for the two different tacking routes (dotted and solid) are of equal length.

The method disclosed here automates the process of calculating the Tacking Time to Destination and adds one further step. Although we have now found a heading that produces a faster Tacking Time to Destination, it is not clear whether this is the optimal heading to minimize the travel time. This requires calculating TTD for many possibilities to determine which has the smallest value. Again, not something that can be done mentally with any accuracy, particularly while also looking after sailhandling.

The object of the present invention is therefore to provide a convenient method for calculating Tacking Time to Destination and determining the optimal heading for minimizing this time. In accordance with the objectives of the invention, two implementations will be disclosed for determining the optimal route on board: algorithms for calculations on computer or GPS, and a manual device with moving dials to indicate the best heading.

This invention resolves a long-standing dilemma in seafaring, to quickly determine the optimal sailing heading. A further advantage of this invention is its use with novice sailors. Beginners often have trouble estimating where the wind is coming from, and how to set the sail at one angle to the wind, independent of the boat's heading. It is also not intuitive to some learning sailors that you can sail into the wind, and that a sailboat could in principle go faster than the wind (since modern sails are powered by lift on most points of sail, and are not simply pushed by the wind). For training the beginning sailor before they set off on their own, it would be useful to be able to illustrate the tradeoff between heading upwind to the target and heading off the wind, and to demonstrate the optimal route for minimizing the Tacking Time to Destination.

BRIEF DESCRIPTION OF THE FIGURES

FIG. 4: is a look-up table of typical boat speeds on different points of sail (angles to the wind), similar to data provided by manufacturers in polar plots for specific boats.

PREFERRED EMBODIMENT OF THE INVENTION

Figure 2:
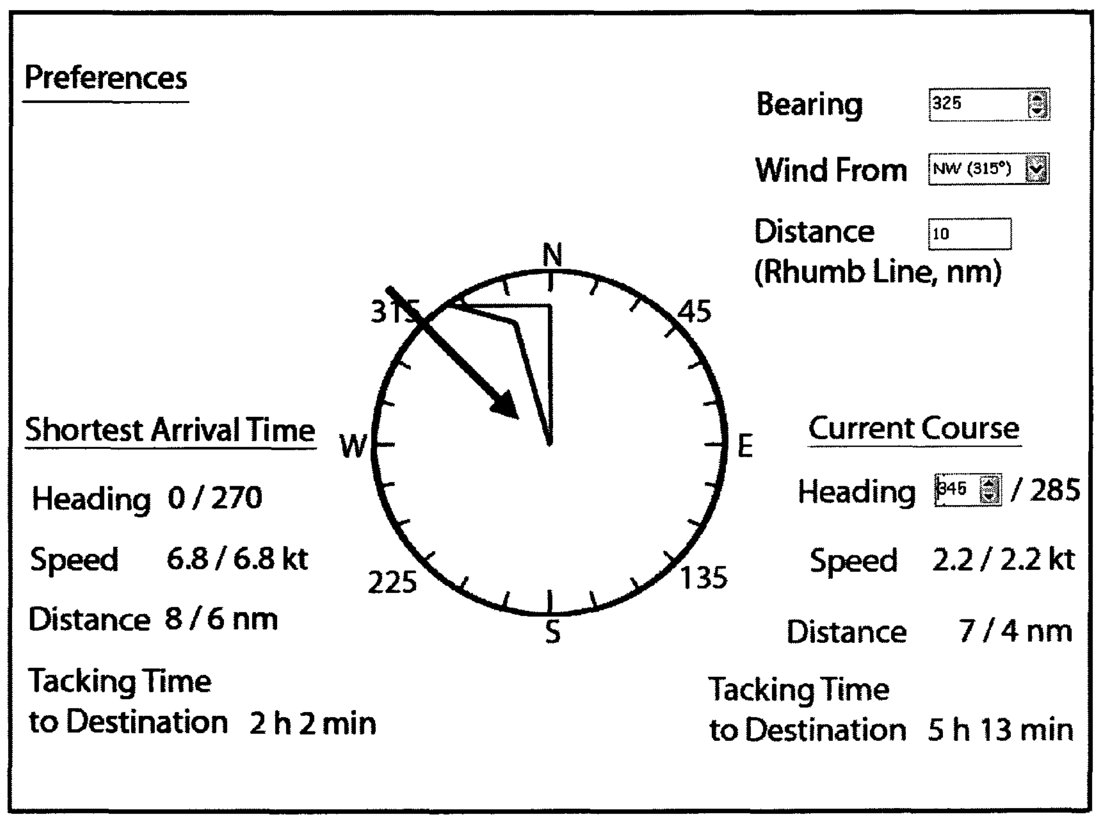
FIG. 2: is a screenshot of a software program calculating the current and optimal Tacking Time to Destination and displaying the sailing angles on a compass face.

Placing all of the calculations and comparisons in a software program provides a precise way to determine the optimal heading to minimize Tacking Time to Destination. While this can be strictly numbers and text, the software could also have a graphical user interface such as showing routes on a chart display, on an aerial photo, on a GPS chartplotter or within a navigable 3D scene model—any of which could illustrate the directions, speeds and distances involved. A preferred embodiment is shown in FIG. 2, where the directions are shown on a compass face. In this type of software it is possible to give the user the option of specifying the graphic used in the background such as a compass or a chart, for example. The preferences can be set for North Up or for Heading Up if the routes are displayed. On the compass display, the user's location is assumed to be at the center of the compass. The destination is indicated by a large dot on the edge of the compass. The direction the wind is coming from is indicated by a line with a small arrow that moves around the compass pointing inward at the center.

In order to determine the Tacking Time to Destination (TTD), the user provides the direction to the destination (the "bearing"). To get the TTD in hours rather than just a relative indicator of the optimal heading, the rhumb line distance to the destination can also be provided. The user must also provide the angle of the wind. From this information, the optimal heading can be calculated to minimize the Tacking Time to Destination. If the user wishes to compare their Current Course, they can also provide their heading. Then, in this preferred embodiment, the software calculates and displays the speed, distance and travel time for the current route and the optimal route. In the preferred embodiment as shown in FIG. 2, the current course information is shown on one side in one color, and the optimal course is shown for comparison on the other side of the screen, in a different color. Any time the user changes one of the parameters, the calculations are re-done instantly and the display is updated.

In the preferred embodiment shown in FIG. 2 with a compass face, the tacking angles for the current and optimal routes are also illustrated. These are shown in colors matching the text for the current and optimal routes, to make it clear which route is which. By scaling the two routes on the compass face, the user can see the direction to the target destination, and the angles and tacking in the current and preferred route. It should be immediately apparent which route is shorter, and which route is farther off the rhumb line, although the speed on each route will need to be accounted for to determine which has the fastest Tacking Time to Destination. The user can compare all of this information for their current and optimal routes to see if their intended route is good, or how much longer their chosen route would take. For both the optimal heading and the current heading, the user can compare the Tacking Time to Destination in hours and minutes, the distance in nautical miles, and the boat speed in knots. Although the preferred embodiment uses these units because they are common in marine navigation, other measures of distance and speed could also be used.

Trigonometry

In order to calculate the distance along the legs of different tacking routes, a trigonometric calculation is needed. The calculations given here are one preferred embodiment. However, if a different method is used to determine the distances involved (e.g., a laser range finder) or a different method is used to define the ratio between the tacking distance and speed off the wind (e.g., manual dials), these calculations can be changed or replaced and are only one possible embodiment of the overall method disclosed here.

Figure 1:
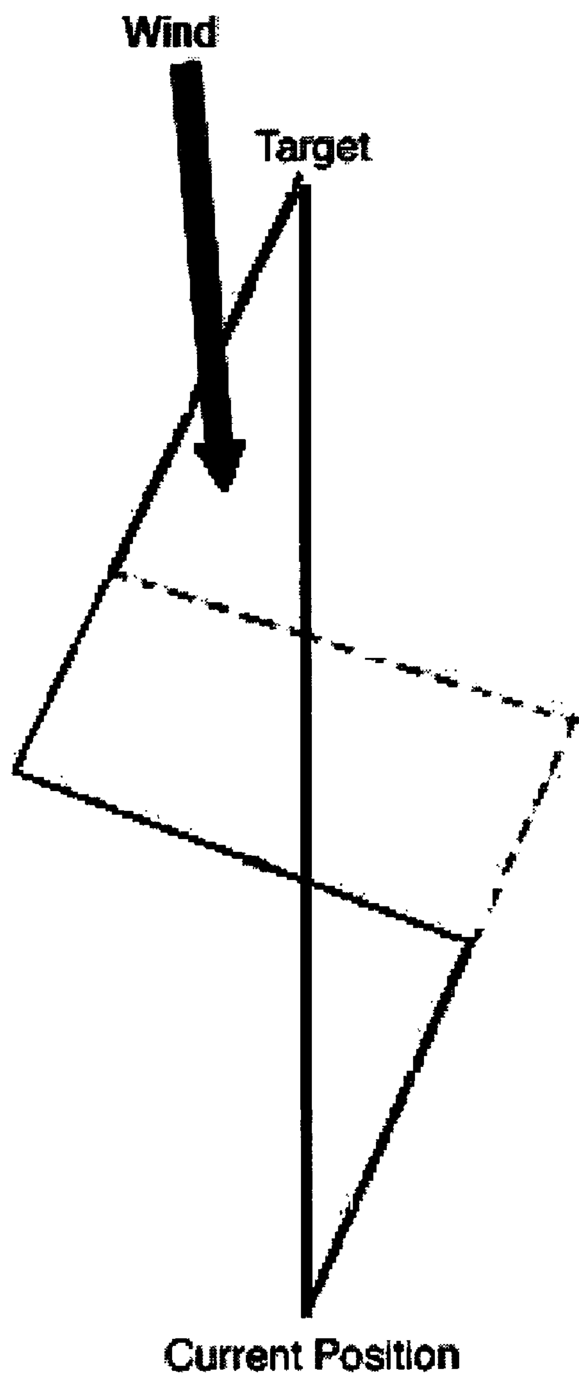
FIG. 1: shows a schematic diagram of a typical route for tacking upwind in a sailboat.
Figure 3:
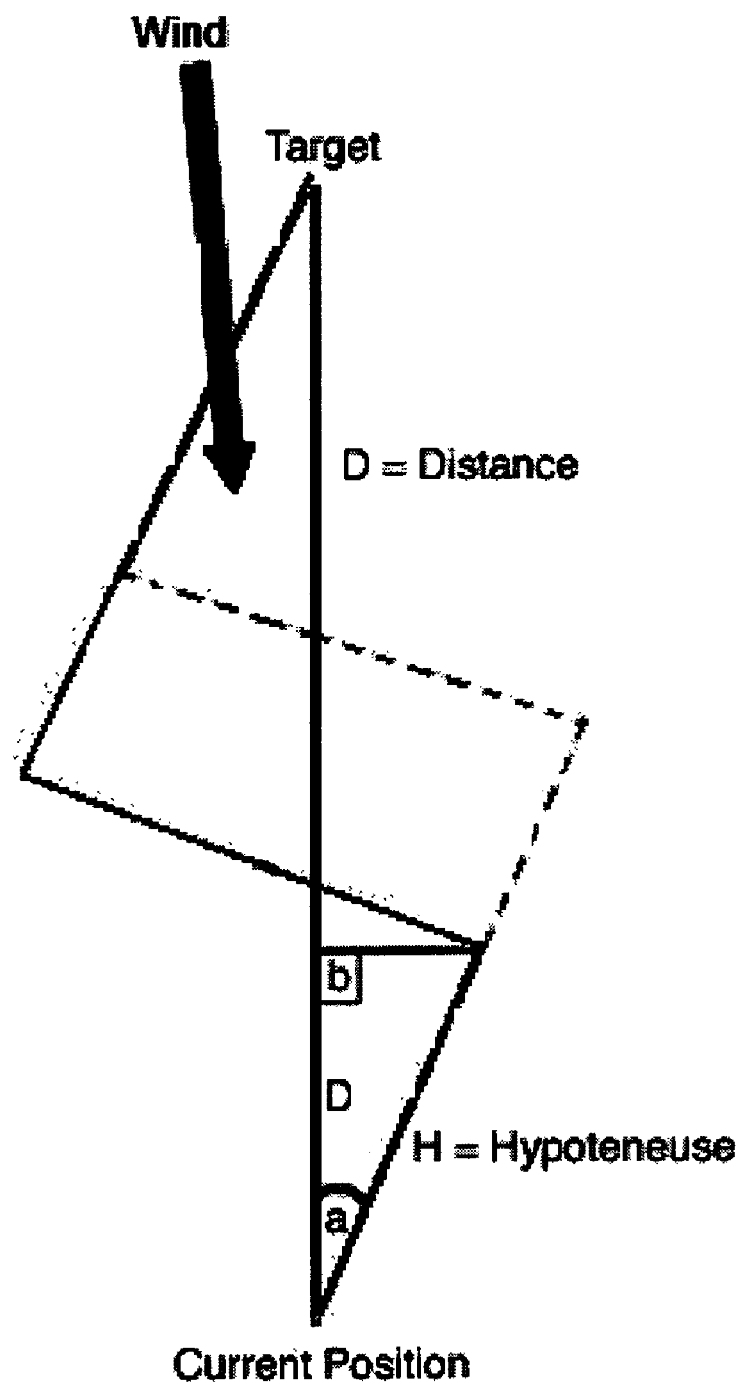
FIG. 3: shows labels used in trigonometric calculations for the distance when tacking upwind.

As noted previously for FIG. 1, the tacking angles and distances are the same regardless of where the turns are, or the lengths or numbers of legs. In FIG. 1, the two tacking routes are the same distance. So we should be able to arbitrarily define the distance to the first left (port) turn, D' (D-prime). In FIG. 3, more labels are added to the same diagram. We know the heading angle "a" and that angle b=90 degrees. But the question is: what is the length of H, the hypotenuse? The answer is that: Cos a=D'/H. Therefore H=D'/Cos a.

To further calculate the entire distance traveled on a particular route, we can further define "w" as the angle between the wind direction and the rhumb line. D is the distance from the current position to the target straight along the rhumb line. TTD is the Tacking Time to Destination; i.e., the overall time of sailing all of the legs to the destination. Therefore: Tacking Distance=D*(sin (a+w)+sin (a−w))/sin (pi−2a). If the boat speed on each leg is the same, then the overall tacking distance on the legs divided by the speed gives the Tacking Time to Destination. However, in the preferred embodiment disclosed here, we take a more generic approach that assumes that the speeds could be different on each leg. Therefore this preferred embodiment takes distance on leg 1 which is Leg 1=D'*sin (a+w)/sin (pi−2a) and divides this by the speed on leg 1. Next, the distance on leg 2, which is Leg 2=D*sin (a−w)/sin (pi−2a) is divided by the speed on leg 2. The resulting two times are then added to get the total Tacking Time to Destination.

Extending the logic that port and starboard tacks may not be symmetric, the computer program in the preferred embodiment shows separate data for the first leg and the second leg. In FIG. 2 it can be seen that pairs of numbers are shown for the heading, speed and distance on both the current and optimal routes. The first number in each pair is for the first leg, and the second number is for the second leg of the trip. As noted above, two legs are used for illustration in this preferred embodiment, although the distances and angles are not changed by tacking through more than two legs, other things being equal.

Distance and speed can be calculated and assessed for each leg on the current route. But these calculations can also be extended to other possible routes to define the route with the lowest travel time (TTD). The simplest way for a computer to do this is to do calculations for possible routes on all 360 points of sail, and to select the fastest. A less computationally-intensive approach would be to calculate TTD for intervals around the compass, and then to hone in to calculate TTD for smaller degree increments in the fastest of the coarse estimates.

Polar Plots

In addition to the overall distance traveled, this preferred embodiment also requires data on boat speed to predict the Tacking Time to Destination. Rather than the angle to the target, the boat speed is a function of the angle between the heading and the wind. Polar plots are often empirically defined by manufacturers for speed on different points of sail. Speed functions vary with different wind speeds, and also with other variables such as sea conditions and the boat's length. We therefore assume that the Tracking Time to Destination is calculated based on speed and distance, other things being equal.

In the preferred embodiment, we assume that sailboats with keels have displacement hulls and have a maximum hullspeed defined by their length. However, TTD calculations can also be made for planing hulls, and relative improvements in route can be determined without specific data on hullspeed or distance.

Traditional square-rigger sailing ships were pushed by the wind and were therefore limited to the speed of the wind. Modern triangular sails develop power from lift as the wind is separated and rushes past one side or the other of the curved sail. Because they are powered by lift not wind speed, modern sailboats often have their fastest point of sail approximately 45 degrees into the wind. This is often the top speed zone on a polar plot. Boat speed would be zero (stopped) when aiming at the wind, often reaches its maximum around 45 degrees off the wind, and then decrease somewhat when sailing downwind. In this preferred embodiment, a look-up table (FIG. 4) is used to define the pattern typically shown on polar plots for boat speed relative to wind angle. The precise values can change for different models of boat.

The invention disclosed here does not rely on these particular values, but on the principle that boat speed varies on different angles to the wind, and that this must be taken into account in calculating Tacking Time to Destination. A function rather than a table of discrete values could also be used.

Real-time data could be obtained for angle to the wind and boat speed, although this would require trial-and-error testing of different headings to determine the speed function, effectively defining a new polar plot en route.

Relative Tacking Time to Destination (TTD)

Once we know how far the vessel is traveling on the zigzags ("tacks", in sailing terminology), we have a bit more work to determine the final goal of Tacking Time to Destination. TTD is defined by a tradeoff between the distance the boat has to travel, and its speed. Ironically, as it turns away from the target, when traveling into the wind, their speed increases. So the question is what is the optimal balance of speed and direction to get the lowest TTD. We can calculate the TTD by dividing the distance by the boat speed. At minimum, the user needs to define the angles to the wind and to the target. If data is available on the waterline length and distance to the target, the absolute Tacking Time to Destination can be determined rather than relative comparisons.

For boats that have to displace water as they move through it (because they are not planing on top of the water), the length of the boat is the determinant of maximum speed ("hullspeed"). This is true for displacement hulls of any size. The longer the waterline of the boat, the greater its hullspeed. In this preferred embodiment, percent of hullspeed is used as a default. If data is provided on the boat's waterline length, the absolute hullspeed can be calculated. The software uses a took-up table such as (but not restricted to) the values in FIG. 4, to determine percent of hullspeed or a specific speed prediction if the waterline length is known, as a function of angle to the wind. This allows relative speed to be converted to speed in Knots (nautical miles per hour) or other units. Experts familiar with naval architecture will know that there is a standard formula for maximum hullspeed in knots, which is 1.34 times the square root of the boat's waterline length. Although this is used in the preferred embodiment, the invention is not limited to this formula for calculating maximum boat speed for displacement, planing or semi-planing hulls.

The methods disclosed here calculate the travel distance for different tacking angles and the boat speed in relation to the angle to the wind. In accord with the objectives of the present invention we then combine the speed and distance in a ratio to calculate the relative or absolute Tacking Time to Destination.

Manual Implementation

There are a number of methods that could be used to display TTD information to the user. In the preferred embodiment shown in the screen shot of computer software in FIG. 2, there are boxes into which the user can enter specific information on wind direction and bearing to destination. While that is a preferred embodiment, it would also be possible to have the user click on a space on the screen to indicate directions, or to have them drag arrows on-screen. Various methods of data entry are possible, any of which could be used with the method disclosed here for calculating the Tacking Time to Destination. Similarly, the programming language in which the software is written could be java or javascript to allow operation in a web browser. The software could be contained in an executable file using a language such as C, C++ or C# to run on a variety of personal computers. The software could also be packaged within a GPS unit, or could be in a Dynamic Link Library (DLL) to allow use by other companies or programs.

Figure 5:
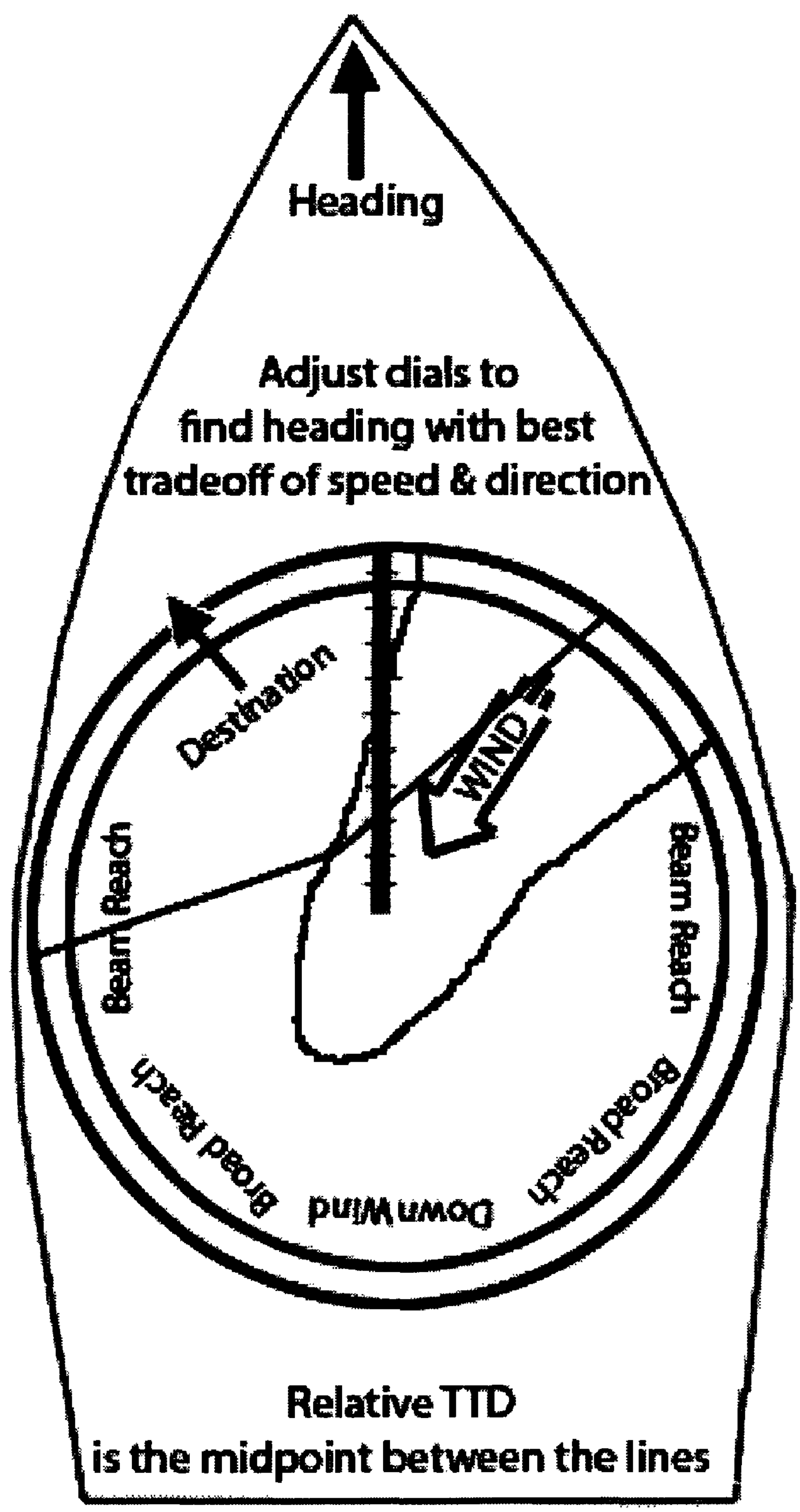
FIG. 5: shows a plastic prototype, in which one dial can be manually rotated to indicate wind direction, one dial is turned to indicate the bearing to the destination, and by turning the boat's heading the optimal heading for the fastest Tacking Time to Destination can be seen.

Beyond electronics though, another preferred embodiment of the invention is to manually enter the bearing and wind angle using adjustable gauges, in a plastic or mechanical device such as the one shown in FIG. 5. Although other types of sliding scales may be used, in this preferred embodiment the dials are rotated. Two dials are used, one for wind direction and one for bearing direction to destination. Beneath the dials is a straight line representing the boat's heading (shown with hash marks in FIG. 5). This line can optionally have an index of arbitrary units for calculating relative TTD. But whether a unit scale is shown or not, the TTD values are arranged along this scale with the lowest TTD at the center, and larger TTDs towards the outer edge of the circle.

The lines on the dials are based on the polar velocity prediction plots for speed and the trigonometric calculations for tacking distance discussed above. More precise lines could be drawn that do not change the principle of the invention being illustrated here. But the general functions on each dial (shown separately in FIG. 6) is that they are curved to show increases in sailing time based on where they cross the vertical heading line when rotated. When the boat is headed away from the direction of the destination, the line on the dial crosses the vertical heading line farther out from the center of the dial, indicating that the TTD will increase. Similarly, there is a U-shaped function for the effects of wind angle on boat speed. When heading too close to the wind, the Relative TTD is largest. Like a polar plot, as the boat heads off the wind and gets maximal lift, this dial shows when the maximum speed is incurred based on polar plot data or a look-up table such as that in FIG. 4.

In order to define the relative TTD for any point of sail, we need to account for the tradeoff between increasing speed and increasing distance as the boat heads off the wind. A simple method to relate these two variables with this device is to simply take the midpoint between the lines on the two rotating dials. The closer the midpoint gets to the center of the dial, the shorter the relative TTD.

Figure 6:
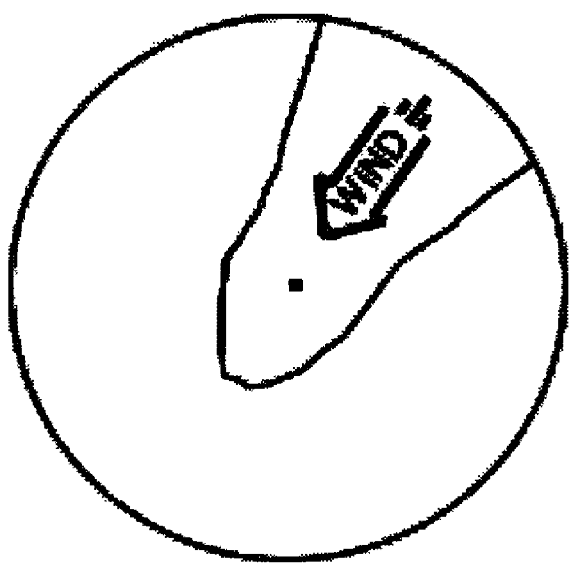
FIG. 6: shows the two dials used in the plastic prototype for convenient manual assessment of Tacking Time to Destination without electronics.
Figure 6:
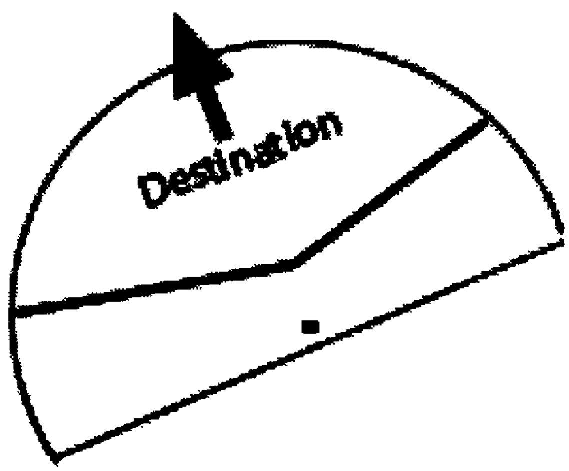

The two dials are shown off of the larger background in FIG. 6. Part of the top dial has been cut away so that both can be accessed to manually rotate. For better precision, the preferred embodiment (not illustrated here) is to place the scales for trigonometric distance and sailing speed on different points of sail directly onto the rotating dials. Then, when the distance dial is turned (the one with the straighter line, on the lower half of FIG. 6) an exact distance is shown where the line on the dial crosses the straight, vertical heading line (shown with hash marks on FIG. 5). When the speed dial is turned with the U-shaped line (upper dial in FIG. 6), the exact boat speed would be indexed where the vertical heading line is crossed. To define the speed-distance tradeoff, the quotient of distance over speed is then taken. This is one division that must be calculated manually or mentally, if the actual travel time in hours is desired for that leg of the trip.

A plastic device such as the prototype shown in FIG. 5 could be manufactured inexpensively, while being portable, weatherproof, mounted or handheld. It could also operate in a pitching boat, and would not require electricity or GPS. Because it can be used without writing down any calculations, it is most convenient to use for getting the optimal heading on only one tack, and then to reuse it for the subsequent tack. It would allow the sailor to quickly define the tack heading to optimize the Tacking Time to Destination.

Embodiments of the invention in which exclusive privilege or property is claimed:

1. A method for determining an optimal Tacking Time to Destination by comparing tacking distances and speeds for a boat from a current position to a destination position for different possible courses, and determining an optimal course to minimize the Tacking Time to Destination, said method comprising:

a) estimating additional distances from a current position to a destination position entailed by tacking for different possible courses;

b) estimating boat speed on tacking legs from a current position to a destination position for different possible courses;

c) estimating Tacking Time to Destination based on the distance divided by speed for tacking legs for different possible courses;

d) assessing the optimal course to minimize the Tacking Time to Destination by determining a distance and speed for the course with the smallest travel time;

wherein current and optimal tacking legs are displayed with GPS chartplotter software showing the courses, the distances, speeds and Tacking Time to Destination for each course.

2. The method of determining the optimal Tacking Time to Destination in claim 1, wherein a ranking of the optimal relative course is determined from information on wind angle and bearing to destination.

3. The method of determining the optimal Tacking Time to Destination in claim 1, wherein Tacking Time to Destination in hours and minutes is determined with additional data on boat length and linear distance to destination.

4. The method of determining the optimal Tacking Time to Destination in claim 3, wherein estimates of speed and distance are calculated for both the current route and the optimal route.

5. The method of determining the optimal Tacking Time to Destination in claim 1, wherein a function or look-up table is used to estimate percent of hullspeed on different points of sail of a boat based on either general polar velocity plots or specific polar plots for a particular boat.

6. The method of determining the optimal Tacking Time to Destination in claim 1, wherein a trigonometric formula is used to define the distance, which is a tacking leg Leg I=D'*sin(a+w)/sin(pi−2a) and divides this by the speed on Leg 1 to get the predicted time for Leg 1.

7. The method of determining the optimal Tacking Time to Destination in claim 6, wherein the distance on each tacking leg is divided by the speed on that tacking leg, with sum of the resulting quotients giving the overall Tacking Time to Destination.

8. The method of determining the optimal Tacking Time to Destination in claim 7, wherein a travel time is calculated for each different possible tack tacking leg and then choosing the course with the shortest Tacking Time to Destination.

9. The method of determining the optimal Tacking Time to Destination in claim 1, wherein a trigonometric formula is used to define the distance on a tacking leg Leg 2, which is Leg 2=D*sin(a−w)/sin(pi−2a) and divides this by the speed of a boat on Leg 2 to get the predicted time for Leg 2.

10. The method of determining the optimal Tacking Time to Destination of claim 1 wherein a Tacking Time to Destination is determined for many possible tacking leg headings, in which an algorithm is used to reduce the number of calculations, by calculating Tacking Time to Destination in larger tacking leg heading intervals before narrowing in for iterations with more specific tacking leg headings once the courses with the smallest Tacking Time to Destination are obtained.

11. The method of determining the optimal Tacking Time to Destination in claim 1, wherein dials are turned manually on a device with moving dials to determine headings and to indicate the angles to the wind and to the destination, to make relative predictions about the course with the optimal Tacking Time to Destination.

12. The method of determining the optimal Tacking Time to Destination in claim 11, wherein numbered scales are present on dials for distance and speed that indicate speed and distance values that are used in a quotient to predict an optimal heading for a current tacking leg.

13. The method of determining the optimal Tacking Time to Destination in claim 1 comprising displaying a current course and an optimal course, wherein the current course and the optimal course are coded by color or other difference in style, along with numerical and text data to allow visual comparison between the current course and the optimal course.

14. The method of determining the optimal Tacking Time to Destination in claim 1 comprising displaying the current course and the optimal course on a GPS chartplotter, wherein the tacking legs are symmetrical or not, with the numerical and text data for each tacking leg displayed separately.

15. The method of determining the optimal Tacking Time to Destination in claim 1 before a trip, using distance predictions and speed from existing polar plots.

16. The method of the optimal Tacking Time to Destination in claim 15, comprising using existing data on wind direction and polar plots to predict speed.

17. The method of determining the optimal Tacking Time to Destination in claim 15, comprising predicting and displaying speed, distance and travel time for a current course in comparison to the optimal course.

18. The method of determining the optimal Tacking Time to Destination in claim 1, wherein a current course and an optimal course are displayed on aerial photos, chartplotters or schematic diagrams to show distances or relative distances, sailing angles and speed on different points of sail.

19. The method of determining the optimal Tacking Time to Destination in claim 18, wherein the displaying of a current course and an optimal course are done before starting or during a course.

* * * * *